United States Patent [19]

DellaPolla

[11] Patent Number: 4,995,288

[45] Date of Patent: Feb. 26, 1991

[54] SAW GUIDE

[76] Inventor: Michael DellaPolla, 1048 W. Mill Dr., Kennesaw, Ga. 30144

[21] Appl. No.: 369,540

[22] Filed: Aug. 15, 1989

Related U.S. Application Data

[63] Continuation-in-part of Ser. No. 252,903, Oct. 3, 1988, abandoned.

[51] Int. Cl.⁵ ............................................. B26D 5/08
[52] U.S. Cl. .................................... 83/574; 83/471.3; 83/486.1
[58] Field of Search ................... 83/471.3, 489, 467 R, 83/574, 477, 486.1; 30/372

[56] References Cited

U.S. PATENT DOCUMENTS

| | | | |
|---|---|---|---|
| 3,731,572 | 5/1973 | Crooks | 83/471.3 |
| 4,197,775 | 5/1980 | Handler et al. | 83/471.3 |
| 4,355,537 | 10/1982 | Mecsey | 83/574 |
| 4,434,824 | 3/1984 | Bussey | 83/574 |

Primary Examiner—Douglas D. Watts

[57] ABSTRACT

A saw guide is provided including a base, a pair of parallel guide rails affixed longitudinally to the base, a saw assembly slidably mounted to the guide rails, a means for independently adjusting the height of each guide rail above the base to adjust the cutting depth and angle of the saw blade and a fence system attached to the base in a sliding and swiveling manner that allows an opposing clamp fence to clamp a piece of wood to the base in the saw blades path.

7 Claims, 3 Drawing Sheets

SAW GUIDE

This application is a continutaion-in-part application of Ser. No. 07/252,903 filed 10/03/88.

BACKROUND OF THE INVENTION

The present invention relates to the woodworking field. More particularly, it is an adjustable guide for providing support and a consistent cutting plane for power saws.

Woodworking is a tedious task, requiring the cutting of precise angles, bevels, lengths, and other features. Often, as when cutting joints, grooves of exacting depths must be cut into the wood. Furthermore, the need for a precise angled bevel cut is commonplace. With most circular saws, the makers bevel guide is generally off by a few degrees. The saw's adjustment guides are also so small that a "true" 90 degree or 45 degree cut is impossible because the guide is too small to have much precision.

Although saw guides for power saws have been used in the past, none have fully met the needs of the woodworker. For example, no saw guides have provided a means for precisely controlling the depth or beveling of grooves. No saw guide has guide rails that can move independently of one another to fine tune bevel angles. Present guides may appear to have rails that move independently but no allowances have been made for the increased distances between the rails when not at the same height. They have not provided the ability to produce precise crosscuts, ripping, and mitering. None have provided the user with a clear view of the saw blade contacting the wood during operation. Finally, no fence system has been devised to safely optimize the cutting ability of a saw guide.

Therefore, there exists a need, for a saw guide which provides the ability to precisely cut wood.

There also exists a need for a saw guide which provides the ability to produce an accurate depth of cut.

There also exists a need for a saw guide which provides the ability to produce precisely angled beveled grooves by it's rails moving independently.

There also exists a need for a saw guide whose rails can be raised or lowered an exact amount from a given starting point, whose vertical range is not limited by a rod and sleeve arrangement in the posts, is sturdy enough to withstand the weight and vibration of a larger circular saw and whose guide rails are directly attached to the supporting posts for strength and precision.

There also exists a need for a saw guide which provides the user with a clear view of the blade of the saw contacting the wood during operation.

There also exists a need for a saw guide which provides the user with the ability to do ripcuts.

There also exists a need for a saw guide which provides the user with a fence system which optimizes the saw guide's length of cut when cross cutting or miter cutting and can hold the work in place while sawing.

SUMMARY

The present invention is an adjustable saw guide with an adjustable fence system, used to provide support and a constant cutting plane for power saws, which has a cutting surface or base that is slotted to allow movement of the saw fences and guide posts. A pair of parallel guide rails are attached thereto. Specifically, each guide rail is held above the base by a pair of spaced adjustable posts. Each post is connected to each guide rail by a threaded screw means so that the height of the individual guide rails may be adjusted of one another. A slidable housing is provided over each guide rail. A support is attached to each housing. A front cross member is located between and adjustably attached at each end of the supports. A rear cross member is adjustably attached to each support that is attached to the housing so that the front and rear cross members may be adjusted to support different sizes of power saws above the base. Work is positioned by a fence system on the base for aligning a piece of wood during the cutting procedure that maximizes the length of miter and cross cuts and has an adjustable clamp that locks the piece of wood into position for cutting.

In operation, the saw is positioned on the cross members and held in place by fastening means. The depth of the cut and bevel angle are determined or fine tuned by adjusting the height of the guide rails. The inherent inaccuracy of the saw bevel cut gauge can be adjusted for by adjusting the height of the guide rails so a 0 or 45 degree bevel on the gauge is exactly 0 or 45 degrees on the saw blade. Once this adjustment is made, the saw's bevel gauge will give a relatively accurate depiction of the saw blade's angle. The angle of cut is determined by positioning the fences in relation to the cutting path. The saw and cross member assembly can be slid forward and aft to cut the wood, assuring a straight path parallel to the guide rails. The cross members also prevent forward or rearward slippage of the saw. If a bevel cut is desired, one guide rail may be adjusted higher than the other and the posts may be adjusted as necessary to maintain the distance between the guide rails. This will result in an angling of the saw blade, which in turn results in the formation of an angled groove in the wood. If a saw has a bevel cutting ability, adjusting the guide rails can fine tune the bevel angle.

The construction of the present invention also allows the user to easily switch into one of two rip cutting modes. The first is for narrow pieces. The fence is arranged parallel to the guide rails and the wood is fed in from front of the guide while the saw is locked in place. The second entails arranging the carriage so the saw can be placed into it sideways and the wood would be fed into the saw from the side. The fence system can precisely angle the work on either side of the saw's cutting path for cross, miter, or rip cuts. The fences can move forward and aft on the base depending on the length of cut needed and can secure a piece of work to the base plate lending safety to the sawing operation. The construction allows for sight of the saw blade which is essential for precise cuts.

It is therefore an object of the present invention to provide a saw guide that enhances depth of cut and bevel cutting features and whose guide rails can be raised or lowered independently of the other.

It is an object of the present invention to provide a saw guide capable of precise cross cuts, rip cuts and miter cuts.

It is an object of the present invention to provide a fence system which provides for precise alignment and the ability to secure the work to the cutting surface and that can utilize the full length of cut of the saw in the guide during cross and miter cutting.

It is an object of the present invention to provide a saw guide which provides the user a clear view of the saw blade contacting the wood.

It is also an object of the present invention to provide for threaded posts for the support of the rails that allow for precise raising and lowering of the supporting rails an exact amount from a given starting point, not limited in it's vertical range by a rod and sleeve arrangement, is sturdy enough to withstand the weight and vibration of a larger circular saw, and whose guide rails are directly attached for precision and strength.

These and other objects and advantages are provided in the following detailed description with reference to the drawings.

DETAILED DESCRIPTION OF THE INVENTION

Figure 1:
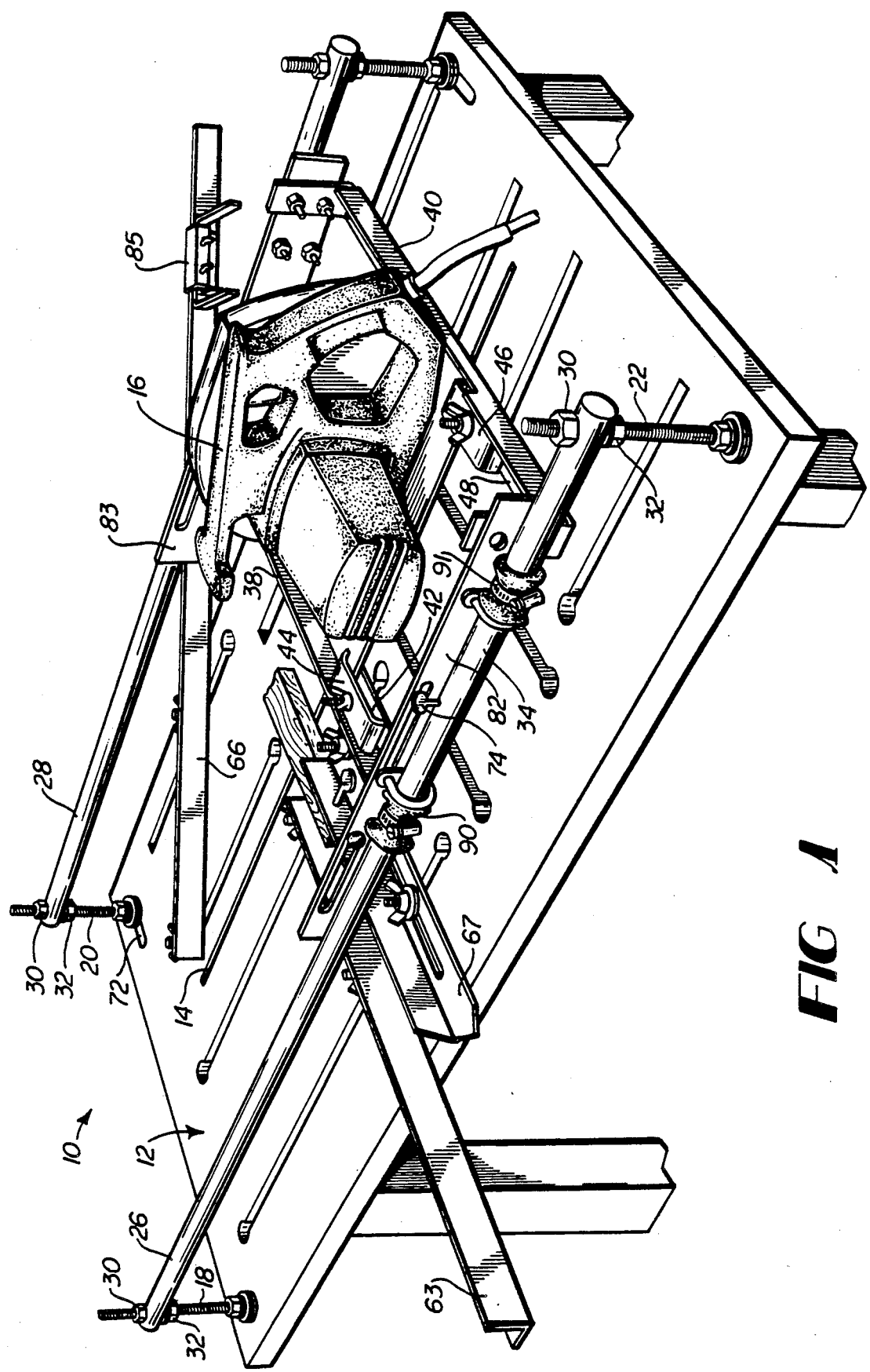
FIG. 1 is a prespective view of one embodiment of the saw guide of the present invention.
Figure 2:
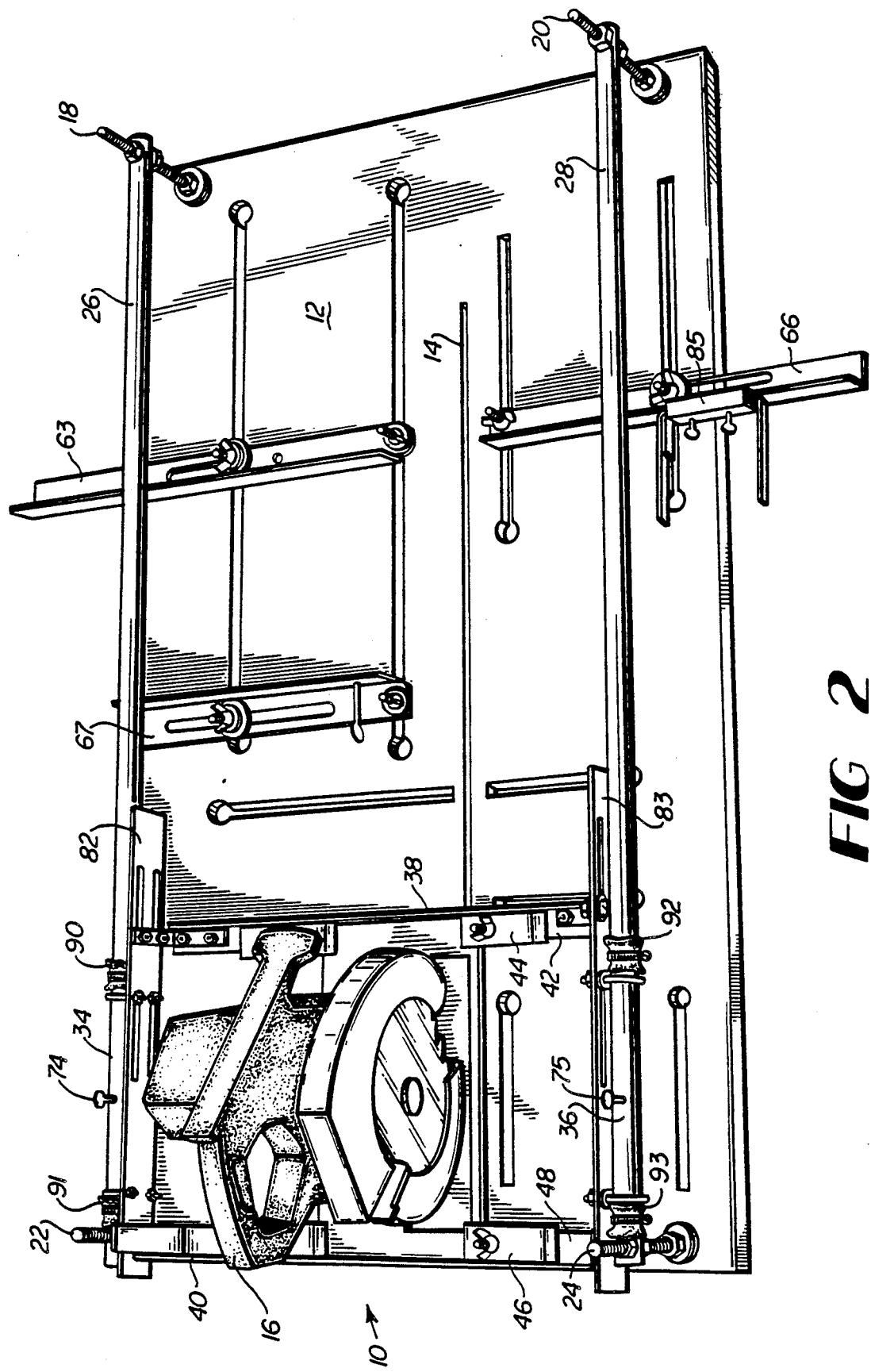
FIG. 2 is an elevated view of one embodiment of the saw guide of the present invention.
Figure 3:
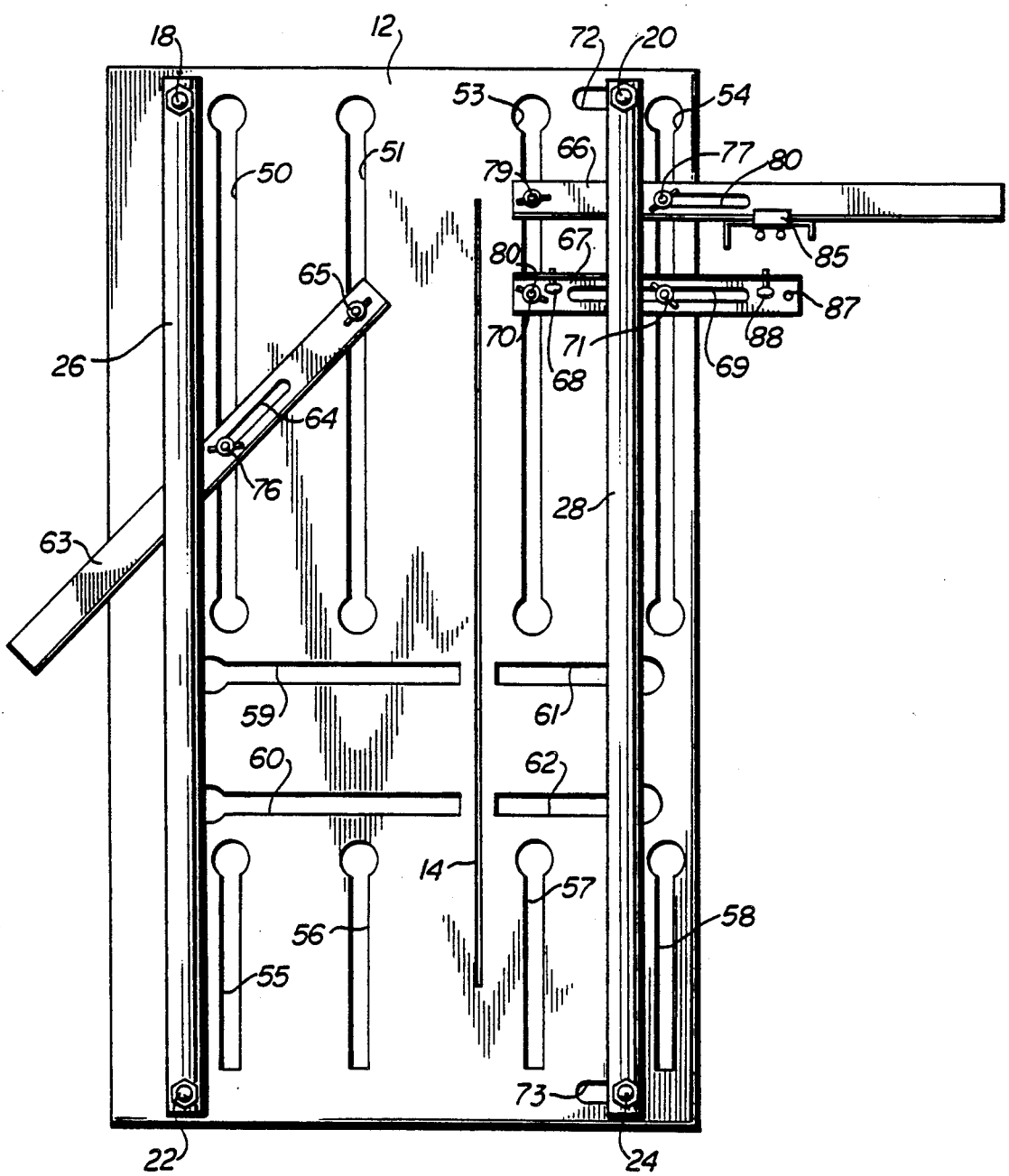
FIG. 3 is an overhead view detailing the base rail supporting means and fence system. The saw carriage and saw have been removed for illustrative purposes.

The preferred embodiment is now described with references to the drawings, on which like numbers indicate like parts. Referring to FIGS. 1, 2 and 3, a saw guide 10 according to the present invention is shown. A flat base 12 for supporting the structure is provided. The base 12 may be made of any material which provides sufficient rigidity, such as wood, metal or plastic composites. The base 12 may be supported on saw horses or the like (not shown) for elevation above the floor and for portability. A straight, notch-like blade path 14 is provided on the base for accommodating the blade of a power saw 16, as described below.

The rail supporting means will be referred to as posts. A forward pair of spaced posts 18, 20 are provided, extending vertically near the forward end of the base 12. A rear pair of posts 22, 24 are provided near the rearward end of the base 12, to form a rectangle with the forward posts 18, 20. Each post 18, 20, 22, 24 is threaded to accept threading means, such as a nut and washer. Posts 20 and 24 may be moved in slots 72 and 73 respectively when the parallel guide rails 26, 28 are at different heights.

A pair of parallel guide rails 26, 28 are provided. Each guide rail 26, 28 is attached at a forward end to forward post 18, 20 respectively, and at a rearward end to rear post 22, 24, respectively. Each guide rail 26, 28 is preferably a straight cylindrical bar having holes there through for allowing positioning of the guide rail 26, 28 over the post, 18, 20, 22, 24. Each guide rail 26, 28 is also held in an adjustable vertical height at each post 18, 20, 22, 24 by threading means, such as a nuts 30 and 32 combination, attachable to the threaded posts 18, 20, 22, 24. In this way, the height of each guide rail 26, 28 may be adjusted a precise known amount as described in more detail below.

A slidable housing 34, 36 is provided on each guide rail 26, 28. Each housing 34, 36 is preferably a tubular length of material telescopically surrounding each guide rail 26, 28 respectively. Each housing 34, 36 is therefore capable of sliding forward and rearward along the length of the guide rails 26, 28 until contacting one post 18, 20, 22, 24. Supports 82, 83 are connected parallel to housing 34, 36, respectively. At the ends of each housing is a material 90, 91 and 92, 93 attached to housings 34 and 36, respectively to keep saw dust from accumulating on the rails or interfering with the sliding mechanism.

A pair of cross members 38, 40 are provided for supporting the power saw 16 above the base 12. A forward cross member 38 is located between and attached to the forward ends of the supports 82, 83. The forward cross member 38 preferably has a supporting surface 42 on which fastening means 44 are provided for fastening the saw 16 to the cross member 38. Similarly, a rearward cross member 40 is located between and attached to the rearward end of the supports 82, 83. The rearward cross member 40 may also have fastening means 46 on a supporting surface 48 for fastening the saw 16 thereto. When the saw 16 is attached to the cross members 38, 40 a cutting assembly capable of sliding forward and rearward, along the guide rail 26, 28 is obtained. For rip cutting wide pieces of wood, the cross members 38, 40 would be moved together the width of the saw. The saw would be placed sideways and reinserted into the cross members 38, 40 being held by fasteners 44, 46. Fasteners 74, 75 are provided on housing 34, 36 to prevent movement of the carriage once in position.

Means for aligning wood for cutting angles, or mitering are provided. Fences 63, 66 move in slots 50, 51 and 53, 54, respectively and are attached to the base 12 by fasteners 76, 65 and 79, 77, respectively. Mitering is accomplished by loosening fasteners 76, 77 and pivoting fences 63, 66 respectively, forward and aft for the proper miter angel and retightening fasteners 76, 77 respectively when that angle is obtained. To do this, fasteners 76, 77 slide in slots 64, 80 which are in fences 63, 66 and slots 50, 54 of base 12. The fences can vary in distance to the user, as in making short cuts, or further from the user when making longer cuts by loosening the appropriate fasteners for the desired fence and sliding it in its base slot to the needed position. By repositioning the fence during miter cuts the user can take full advantage of the saws length of cut in this guide.

An adjustable securing means referred to as a clamp is provided. A clamp 67, is used to secure the work to either saw fence 63, 66, at any matching angle. Fastener 68 is screwed into threaded holes 78 or 88 in the clamp to secure the work to the opposing fence. Fastener 71 slides in slot 69 on clamp 67 and slot 50 on base 12 to vary its angle while fastener 70 slides in slot 51 on base 12. To secure a piece of wood when a longer cut is needed, clamp 67 is moved to position fasteners 71, 70 into slots 55, 56 respectively. To use clamp 67 with fence 66 fastener 70 is removed from hole 87 positioned in hole 80 then clamp 67 is positioned so its fasteners 70, 71 ride in slots 53, 54 or 57, 58 as needed. When rip cutting narrow pieces, fence 63 is positioned so fasteners 65 and 76 slide in base 12 slots 59 and 60, respectively or fence 66 is positioned so fasteners 79 and 77 slide in base 12 slots 61 and 62. Finally, a sliding stop 85 can be attached to either fence 63, 66 to be used to insure the same size lengths of work when many same sized lengths of work are desired. All slots in the base 12 are started and/or ended with an opening large enough to allow the fastening means, 76, 65, 79, 77, 70, 71 that hold in place the fences 63, 66, 67 to pulled up through said base 12 for ease of movement of the fences.

In operation, the device 10 is used to hold a piece of wood in position for cutting and for positioning the saw 16 for producing straight cuts and grooves of precise depth and bevel. For cutting, a piece of wood is placed on the base 12 with one edge along the fence 63 or 66 and the other edge against clamp 67. Fastener 68 is screwed into the wood to secure it in place. The saw assembly, with the saw 16 in the cutting mode and the saw 16 blade entering the blade path 14, is then moved forward to cut the wood. A straight cut is assured because the housings 34, 36 slide along the parallel guide rails 26, 28 and the user has an unobstructed view of the saw blade contacting the wood. Also, the user's hands need never be in the vicinity of the saw blade during sawing operations.

A compensation can be made for the saw's inherent inaccuracy in the bevel gauge. One rail can be raised or lowered an amount which achieves a true correspondence between the saw blade and the bevel gauge. Once this adjustment is made, the bevel gauge will be an accurate representation of the blades angle throughout it's beveling range.

If a groove is to be cut into the surface of the wood, as in the formation of joints, the guide rails 26, 28 can be raised so that the blade of the saw 16 only enters the wood to a depth equal to the depth of the desired groove. If an unbeveled groove is desired, both guide rails 26, 28 are raised the same height at all four supports. If a beveled groove is desired, one of the guide rails 26, 28 may be elevated with respect to the other so that the blade of the saw 16 assumes an angle relative to the surface of the wood to a degree corresponding to the angle of the groove desired. By adjusting the height of both guide rails the correct depth of cut can be obtained. When a guide rail is raised or lowered with respect to the other guide rail the actual distance between rails is increased. To compensate, posts 20 and 24 are positioned in slots 72 and 73 respectively as needed to keep a constant distance between guides 26, 28. Housings 34 and 36 will be able to pivot around guides 26, 28 and will not bind. No other saw guide makes these allowances.

The present device 10 also may be used with a number of different saws 16, each having a different size blade. The height of the guide rails 26, 28 may be increased or decreased until the blade enters the blade path 14 or is otherwise positioned as desired.

While the above desciption contains many specificities, these should not be construed as limitations on the scope of the invention but rather as an application of preferred embodiments thereof.

I claim:
1. A saw guide comprising:
   (a) a base having a flat upper surface;
   (b) a pair of parallel guide rails affixed to said base by a rail supporting means, each guide rail having a forward and a rearward end;
   (c) a saw carriage assembly capable of holding a saw or other power tool, slidably mounted to said guide rails, said guide rails maintaining said saw in a predetermined path when said saw assembly is slid along said guide rails; and
   (d) said rail supporting means attaching at the first end to said base and at the second end to said guide rails; said rail supporting means having a calibration means that allows said guide rails to be adjusted vertically from a known starting point on said supporting means a known given amount wherein said rail supporting means of at least one guide rail are adjustably attached to said base in a lateral axis in order to maintain a given distance between said guide rails to prevent the saw carriage assembly from binding when said guide rails are at differing heights.

2. A saw guide as in claim 1, wherein said rail supporting means comprises two forward threaded posts and two rearward threaded posts, all extending upward from said base, attaching to said guide rails by a top and a bottom adjustable securing means.

3. A saw guide comprising:
   (a) a pair of parallel guide rails affixed to a base by a rail supporting means, each guide rail having a forward and a rearward end;
   (b) a saw carriage assembly capable of holding a saw or other power tool, slidably mounted to said guide rails, said guide rails maintaining said saw in a predetermined path when said saw carriage assembly is slid along said guide rails;
   (c) said rail supporting means attaching at the first end to said base and at the second end to said guide rails; said rail supporting means having a calibration means that allows said guide rails to be adjusted vertically from a known starting point on said supporting means a known given amount.
   (d) said base having a flat upper surface, and openings there through; said openings starting at each supporting means of one of said guide rails running a short distance toward the corresponding supporting means of said other guide rail, which accommodates said rail supporting means in a manner that allows said forward supporting means and said rearward supporting means of one of said guide rails to be moved laterally toward the respective supporting means of said other guide rail, thus allowing for said guide rails to be at differing heights and preventing said saw carriage assembly from binding.

4. A saw guide as in claim 3, wherein said saw carriage assembly comprises:
   (a) a first housing slidable mounted to a first guide rail;
   (b) a second housing slidable mounted to a second guide rail;
   (c) a first support affixed to said first housing;
   (d) a second support affixed to said second housing;
   (e) a front cross member adjustably attached between said first and second supports at a first end to said first support and at a second end to said second support;
   (f) a rear cross member attached at a first end to said first support and at a second end to said second support; and
   (g) a fastening means to secure a power tool to said front cross member and said rear cross member such that said power tool is supported above said base.

5. A saw carriage assembly as in claim 4, wherein said first housing and said second housing can be rotated about said first guide rail and said second guide rail respectively, enabling said saw carriage assembly to pivot about said guide rails when said guide rails are adjusted to differing heights; thus allowing said saw carriage assembly to slide along said guide rails, and be operated in a plane other than the plane of the base without binding.

6. A fence system for a saw guide that has adjustably mounted fences attached to the upper surface of a base for holding a piece of wood in the path of a saw, wherein said fences may be maneuvered and secured forward or rearward on one or both sides along the cutting path on said base; said fence system comprising of;

(a) a base having parallel openings cut there through, running longitudinally along said cutting path of said saw to facilitate the movement of the fences along said cutting path and further comprising means for securing the position of said fences along said cutting path;

(b) said fences each being made out of a straight piece of metal, wood or plastic, having openings cut there through extending lengthwise in the central portions of said fences, and openings at the ends of said fences with fastening means for each opening in said fences that coincides with the openings in said base allowing said fences to pivot and be moved forward and rearward along said cutting path of said base.

7. A fence system as in claim 6, further including an adjustable wood securing clamp fence adjustably mounted to the upper surface of said base for holding a piece of wood in place against an opposing fence comprising;

(b) a straight piece of metal, wood or plastic, having openings cut there through extending lengthwise, and openings at the ends closest to said cutting path with fastening means for each opening in said fence that coincides with the openings in said base allowing said fence to pivot and be moved forward and rearward along said cutting path of said base;

(c) two fasteners for said openings of said wood securing clamp fence wherein one fastener would fasten the center opening of said clamp fence into said base and the other fastener would go in the opening closest to said cutting path and into said base allowing said fence to pivot with said opposing fence;

(d) a threaded opening going through said wood securing clamp fence having an axis that is parallel to said base (e) a threaded rod going through said threaded opening of said wood securing fence in a manner that when tightened would protrude through said fence into said piece of wood, securing it to said opposing fence.

* * * * *